May 12, 1970     C. E. HEWSON     3,511,275
FLUID PRESSURE BIASED VALVE WITH DASHPOT
Original Filed Oct. 18, 1965     3 Sheets-Sheet 1
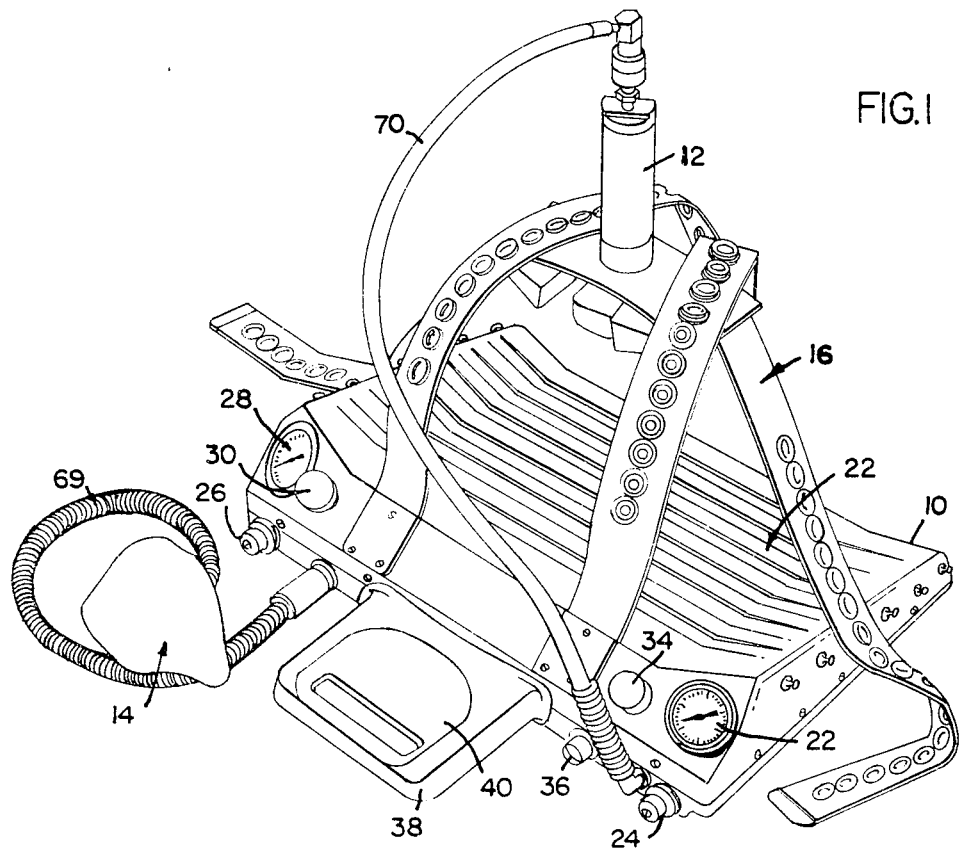
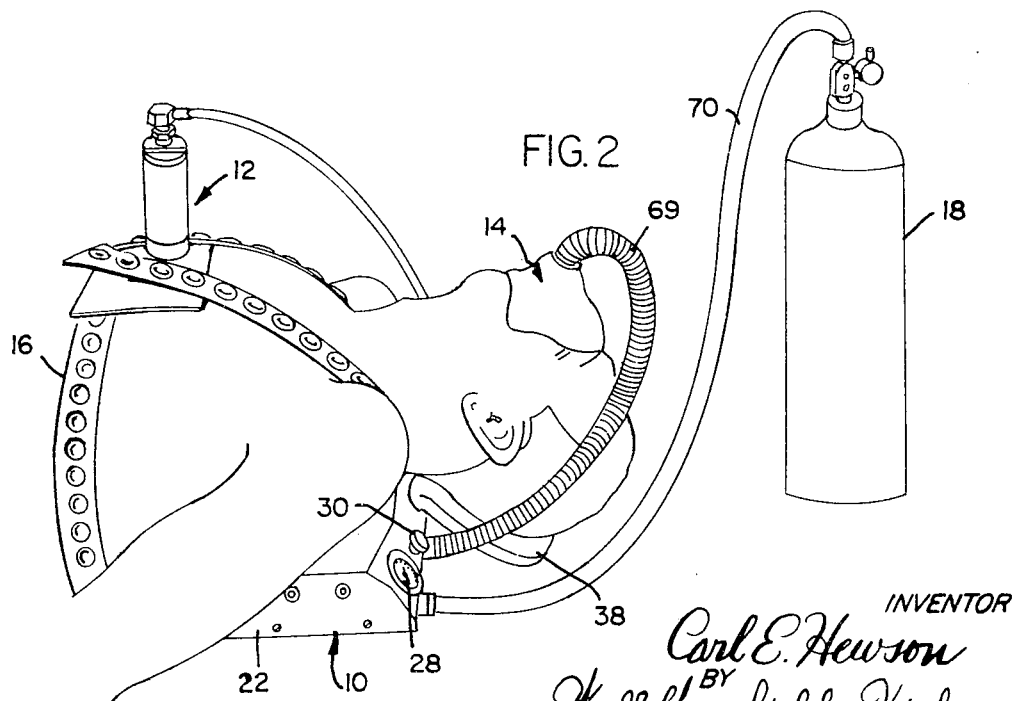
INVENTOR
Carl E. Hewson
BY
Wolf, Greenfield & Hicken
ATTORNEYS

May 12, 1970
C. E. HEWSON
3,511,275
FLUID PRESSURE BIASED VALVE WITH DASHPOT
Original Filed Oct. 18, 1965
3 Sheets-Sheet 2
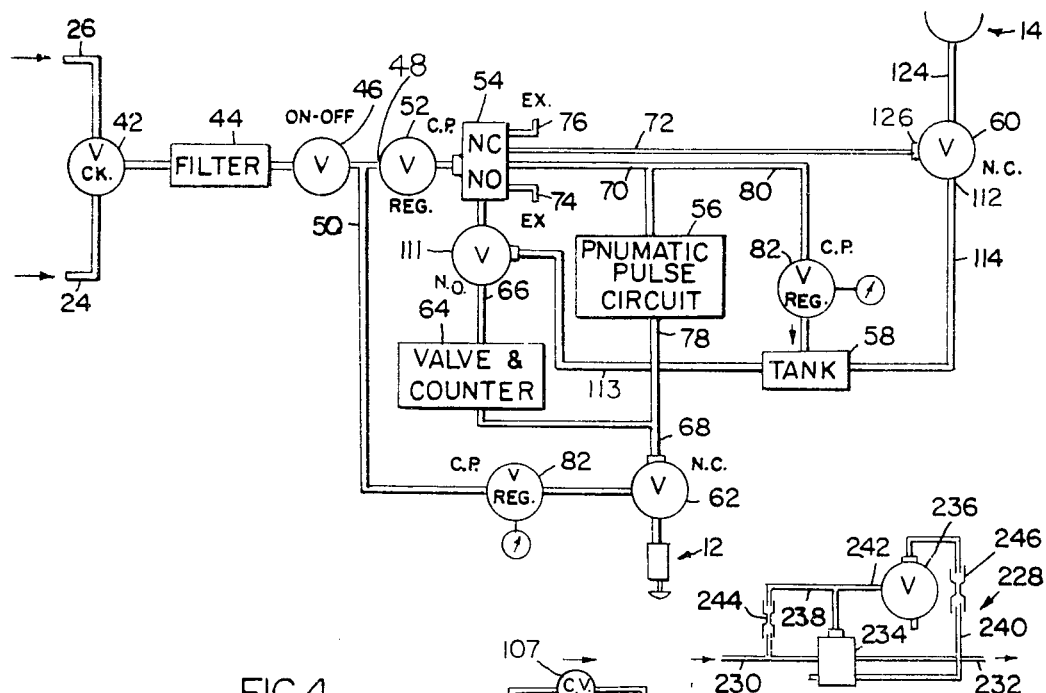
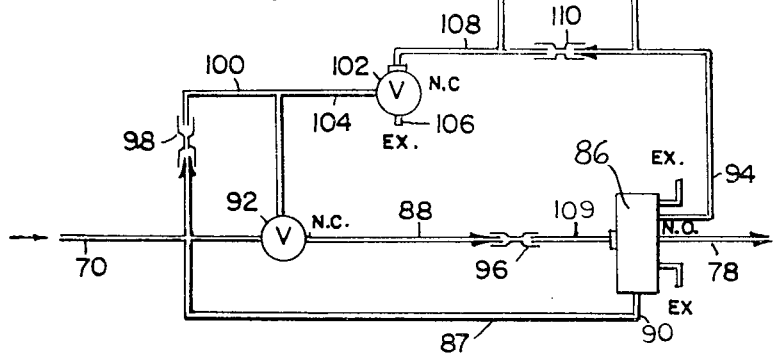
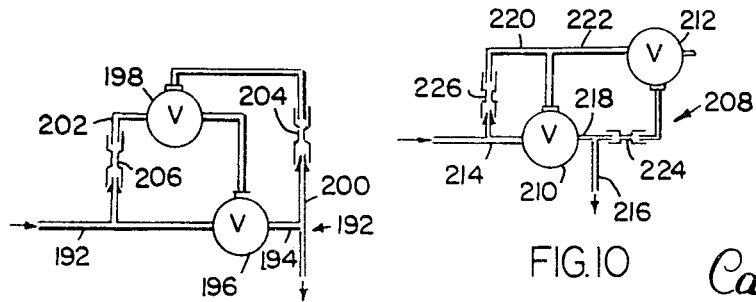
INVENTOR
Carl E. Hewson
BY
Wolf, Greenfield & Hieken
ATTORNEYS May 12, 1970 C. E. HEWSON 3,511,275
FLUID PRESSURE BIASED VALVE WITH DASHPOT
Original Filed Oct. 18, 1965 3 Sheets-Sheet 3
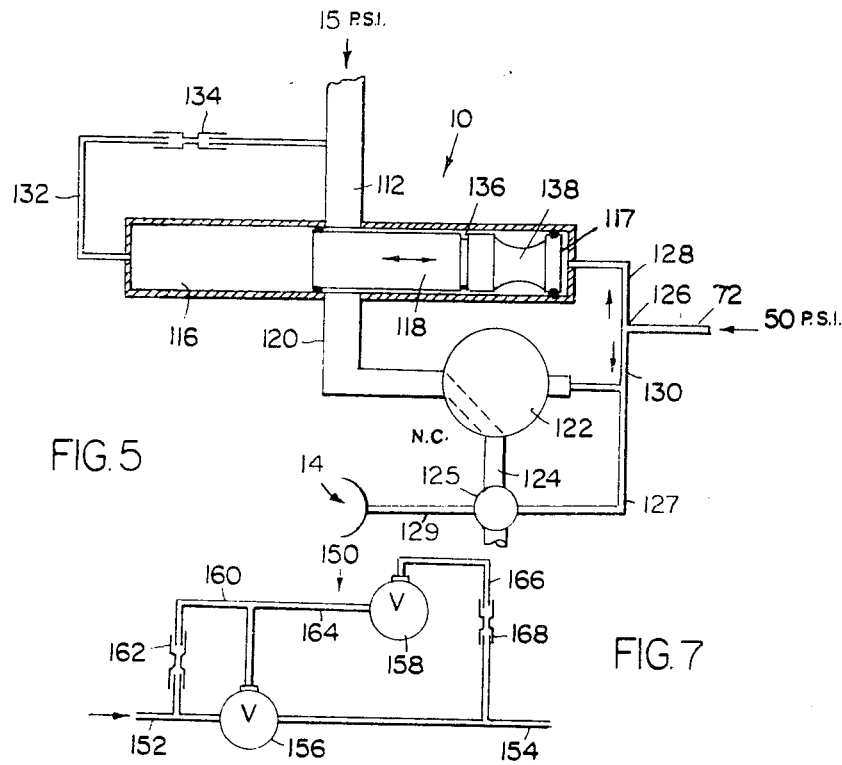
FIG. 5
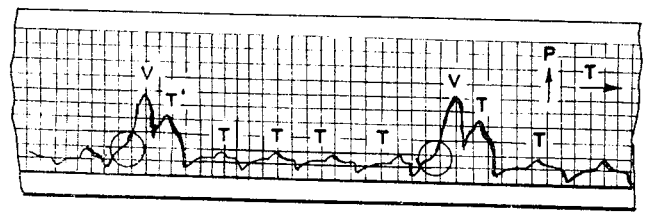
FIG. 7
FIG. 6
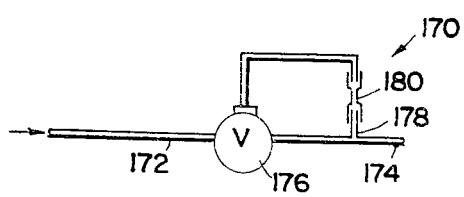
FIG. 8
Carl E. Hewson INVENTOR
BY
Wolf, Greenfield & Hieken
ATTORNEYS

United States Patent Office 3,511,275
Patented May 12, 1970

3,511,275
FLUID PRESSURE BIASED VALVE WITH DASHPOT
Carl E. Hewson, Marshfield, Mass.
(90 Myrtle St., North Quincy, Mass. 02114)
Original application Oct. 18, 1965, Ser. No. 497,211, now Patent No. 3,351,052, dated Nov. 7, 1967. Divided and this application Aug. 7, 1967, Ser. No. 668,731
Int. Cl. F16k 31/12; A61h 31/00
U.S. Cl. 137—596.15                    4 Claims This invention comprises a new and improved heart and lung resuscitator, and this application is a division of application Ser. No. 497,211, filed Oct. 18, 1965, now Pat. No. 3,351,052, which in turn was a continuation-in-part of application Ser. No. 277,169, filed May 1, 1963, entitled Heart and Lung Resuscitator. In that earlier application Ser. No. 277,169 a portable unit is disclosed, and in accordance with the present invention the pneumatic circuits of the unit are improved, the unit is rendered more easily portable, and an improved valve is incorporated into one of the pneumatic circuits for directing ventilating gas to the lungs in a prescribed manner.

The unit shown in the earlier application includes a shoulder lift and a separate control case in which the pneumatic circuits are housed. While the unit is portable, there is some inconvenience involved in moving a patient from one location to another while he receives treatment from the unit because of the several different parts which make up the assembly. The pneumatic circuit disclosed in the earlier application is very basic and does not, for example, precisely control the rate at which the pressure increases as the lungs are ventilated. Further, the means for producing a pneumatic pulse to control cardiac compression is not refined to a point where the intervals between pulses are precisely the same. These and other parts of the unit shown in the earlier application have been the subject of continued research, and several improvements have matured from this research, which are the subject matter of the present application.

One important object of this invention is to provide a pneumatic control circuit for the assembly which may be mounted wholly within the shoulder lift so as to eliminate one large component of the system as disclosed in the earlier application.

Another important object of this invention is to provide a pulse circuit as part of the pneumatic system which has a high degree of dependability, is relatively inexpensive to manufacture, and which may be very precisely controlled.

Another important object of this invention is to provide a valve in the lung ventilating system of a resuscitation unit, which precisely controls the rate of increase of volume of the ventilating gas as it is introduced into the lungs.

To accomplish these and other objects, the rescue unit of this invention includes a piston and cylinder for applying cardiac compression, a fixture for introducing ventilating gas into the lungs, and a pneumatic control circuit connected to both the piston and cylinder and the fixture so as to coordinate the cardiac compression with the lung ventilation. The control circuit is mounted within a shoulder lift ordinarily placed beneath the shoulders and upper back of a patient. A pluse circuit, forming part of the pneumatic control circuit, at very precise intervals actuates the piston and cylinder so as to apply cardiac compression of a selected pressure for a prescribed duration at regular intervals. A valve forming part of the pneumatic control circuit in the shoulder lift gradually increases the volume of the ventilating gas introduced into the lungs rather than allow a very sudden and rapid increase of volume to occur.

These and other objects and features of this invention along with its incident advantages will be better understood and appreciated from the following detailed description of an embodiment thereof, selected for purposes of illustration and shown in the accompanying drawing, in which:

FIG. 1 is a perspective view of a heart-lung resuscitator constructed in accordance with this invention;

FIG. 2 shows the unit of FIG. 1 in use on a patient;

FIG. 3 is a diagrammatic view of the pneumatic control circuit mounted in the shoulder lift shown in FIG. 1;

FIG. 4 is a diagrammatic view of a pulse circuit forming one component of the pneumatic control circuit shown in FIG. 3;

FIG. 5 is a diagrammatic view of a pneumatically controlled valve forming part of a pneumatic control circuit shown in FIG. 3;

FIG. 6 is a graph illustrating the time relationship between pressure applied to the chest of a patient through the ventilator and the cardiac compressor; and FIGS. 7–11 are diagrammatic views of other embodiments of a pulse circuit.

The resuscitator unit shown in FIG. 1 includes a shoulder lift 10, a cardiac compressor unit 12, a lung ventilating unit 14 and straps 16 for retaining the compressor unit 12 in proper position on the chest of a patient. In FIG. 2, the assembly is shown in use on a patient with the units 12 and 14 in place, and an oxygen tank 18 is shown connected to the case 22 of the shoulder lift. The case 22 is shown in FIG. 1 to carry a pair of oxygen connectors 24 and 26, one on each side, a lung volume gage 28, a control knob 30 for varying the volume of ventilating gas directed to the lungs, a gage 32 for measuring the thrust of the cardiac compressor unit 12, a control knob 34 for varying the thrust, and an on-off switch 36. A handle 38 for carrying the case 22 is provided with a shallow recess 40 in its upper face that forms a comfortable head rest for the patient.

The pneumatic circuit shown in FIG. 3 is mounted within the case 22 of the shoulder lift 10. The circuit shown includes the inlets 24 and 26 which are combined at a double check-valve 42. Ordinarily one of the inlets is connected to the oxygen tank, and when the tank gets low a second tank may be connected to the other inlet. As oxygen is ordinarily used, the specification will refer to it as the gas in the system, but it is to be understood that other gases may be used. From the check valve oxygen in the circuit passes through a filter 44, and an on-off valve 46, and then divides into a pair of lines 48 and 50. A pressure regulating valve 52 is disposed in the line 48 and produces a constant pressure at its outlet.

A pneumatically controlled valve 54 is connected to the end of the line 48 and serves to distribute the compressed $O_2$ to a pulse circuit 56, a tank 58 and the pilot side of a pneumatically controlled ventilation valve 60. The pulse circuit 56 in turn has its output connected to the pilot of another pneumatically controlled valve 62 and valve and counter 64. The valve and counter 64 lies in a pilot line 66 which controls the operation of the first pneumatically controlled valve 54.

The line 50 beyond the on-off valve 56 directs oxygen through the pneumatically controlled valve 62 whose pilot line 68 is connected to the outlet 78 of the pulse circuit 56. In FIG. 3 the mask 14 and the cardiac compressor 12 are shown connected to the outputs of the pneumatically controlled ventilating valve 60 and the pneumatically controlled valve 62, respectively. As shown in FIG. 1, these parts lie outside the case 22 and are connected to the case by hoses 69 and 70.

Before describing in detail the control circuit shown in FIG. 3, the relationship between the operation of the lung ventilating unit and the cardiac compressing unit will be described. The most effective rate for external cardiac compression to maintain a high average blood pressure has been determined to be approximately 60 compressions per minute; the most effective rate of lung ventilation has been determined to be approximately 12 ventilations per minute. A heart-lung resuscitator to be effective should duplicate this relationship. Therefore, pressure is applied to the chest by the compressor unit 12 five times for each time the lungs are ventilated by directing oxygen into them through the unit 14. It is also important that the oxygen be directed into the lungs between the application of pressure on the chest exerted by the unit 12. That is, the pressure applied externally to the chest should not be directly opposed by oxygen under pressure within the lungs. These relationships are shown in the graph of FIG. 6 where time is plotted against pressure exerted by the resuscitator. In the graph the peaks T represent four thrusts exerted against the chest by the unit 12. The peak V represents the volume of oxygen introduced into the lungs through the ventilator unit 14. It will be noted in the graph that on the down side of the peak V, that is, when the volume of oxygen in the lungs is being relieved, the thrust T' is exerted. Thus, while the lungs are expelling the oxygen, the fifth trust T' is applied to the chest, and the height of the peak T' represents the cumulative pressure of the thrust exerted by the unit 12 and the residual pressure in the lungs following the peak of ventilation.

It may also be noted in FIG. 6 that the volume of ventilating gas does not increase on a straight line but rather the increase is gradual, particularly in the beginning of the ventilation. Oxygen is initially introduced at a low rate into the lungs and then the volume increases at a faster rate until maximum volume is achieved. This characteristic is represented by the curved section of the graph circled in FIG. 6. This gradual introduction of oxygen into the lungs is achieved by the special ventilating valve 60.

Returning now to the circuit shown in FIG. 3 it is apparent that an oxygen tank can be connected to either one of the inlets 24 or 26, and the double check valve 42 directs the oxygen through the filter 44. The on-off valve 46 controlled by the button 36 on the case 22 is used to shut off or turn on the system. The outlet of valve 46 directed into line 48 is controlled by pressure regulating valve 52 which causes a pressure reduction in the system in all lines which receive oxygen from that point. Typically, the oxygen tank through which the system is supplied is regulated at 90 p.s.i., and the pressure regulating valve 52 may reduce the pressure in the line 48 to 50 p.s.i. Thus, in the line 48 and the system controlled by it, the pressure does not exceed the 50 p.s.i., while in the line 50 the pressure is at 90 p.s.i.

The pneumatically controlled distributing valve 54 ultimately connects the line 48 to either one of the two lines 70 and 72. Under normal conditions, that is, in the biased position, the valve 54 connects the line 48 with the line 70, and only when the pilot line 66 is pressurized does the condition of valve 54 change to connect the line 48 to the line 72. The lines 70 and 72 when not connected to the line 48 are connected to the asmosphere through bleeds 74 and 76, respectively.

When the line 70 is connected to the 60 p.s.i. source through the distributing valve 54, the pulse circuit 56 is energized and emits at its outlet 78 sixty pulses per minute or some other selected approve rate. (The pulse circuit, shown in FIG. 4, is described in detail below.) At the same time the pulse circuit 56 is energized, the tank 58 which lies within the case 22 is filled through the line 80 and pressure regulator 82. The valve 82 may be manually set by the knob 30 shown in FIG. 1 the control the volume of oxygen stored in the tank 58.

The ventilating valve 60 which is normally closed, prevents the oxygen in the tank 58 from discharging to the ventilating unit 14. However, the ventilating valve 60 which is also described in detail below in connection with FIG. 5, opens when the line 72 (which serves as a pilot for that valve) receives oxygen from the distributing valve 54; that is, when the distributing valve 54 changes its condition so that the line 48 is connected to the pilot line 72, the tank 58 no longer receives oxygen from the line, but the contents of the tank 58 are discharged through the valve 60 to the ventilating unit 14. The condition of valve 54 is controlled by the pilot line 66 which is connected in turn to the outlet 78 of the pulse circuit 56. The counter and valve 64 which per se forms no part of this invention, counts each of the pulses emitted by the pulse circuit 56, and when a given number of pulses are recorded, the valve of counter 64 allows a pulse to pass through the pilot line 66 to change the condition of the valve 54. The pulse through the the line 66 as stated above changes the condition of the valve 54 so that it no longer connects the lines 48 and 70 but rather connects the lines 48 and 72.

The outlet 78 of the pulse circuit 56 is also connected through pilot line 68 to the pneumatic valve 62. Each pulse emitted by the circuit 56 opens the pneumatic valve 62 and allows the line 50 to direct oxygen under pressure to the cardiac compressor unit 12. A pressure regulator 82 in the line 50 is controlled by the control knob 34 on the case 22 so that the thrust exerted by the piston and cylinder unit of the cardiac compressor may be varied.

The counter 64 will be recognized from the foregoing description to establish the basic frequency relationship between the lung ventilator 14 and the cardiac compressor 12. While the pulse circuit 56 opens the valve 62 with each pulse of the circuit 56, the counter 64 in the pilot circuit 66 allows the distributing valve 54 to change its condition but once every five pulses of the circuit 56.

The pulse circuit 56 is shown in detail in FIG. 4. It will be noted that the extent of the pulse circuit shown in FIG. 4 is limited by the line 70 (pulse inlet) and the outlet of the pulse circuit 78. For purposes of this description it will be assumed that the line 70 is constantly connected to a pressurized oxygen source. A distributing valve 86 which is pneumatically controlled by pilot line 88 is biased to a condition wherein its inlet 90 is connected to the pulse outlet 78. That is, unless the condition of distributing valve 86 is changed, the line 70 would be continuously connected to the pulse outlet 78 through valve 86.

The pilot line 88 is controlled by a pneumatic valve 92. The normally closed pneumatic valve 92 when opened allows compressed air to flow through the pilot line 88 so as to change the condition of the distributing valve 86 so as to connect in turn the inlet 90 to the line 94 and interrupt the connection between the inlet 90 and the pulse outlet 78. A delay in the form of a resistance 96 is provided in the pilot line 88 to delay the change in condition of the distributing valve 86 after the valve 92 opens. In the absence of the resistance 96, immediately upon opening valve 92 the valve 86 would open. The need for this delay will become apparent upon completion of the description of the pulse circuit.

A second flow resistance 98 is provided in the circuit in the pilot line 100 which connects the line 70 to the pilot of the normally closed pneumatic valve 92. Therefore, the pressure in the line 70 does not instantaneously open the valve 92, but rather, there is a delay in the opening of the valve 92 after the line 100 receives pressurized oxygen from the line 70. The pressure buildup in the line 100 to open the valve 92 is in turn controlled by a pneumatic valve 102 which, when opened, opens the bleed 104 to allow the pressure within the line 100 to bleed through the valve to the exhaust 106. When the valve 102 is closed, the bleed 104 is closed and the pressure in the line 100 builds up to open the valve 92. The pneumatic valve 102 is in turn controlled by a pilot line 108 which contains a flow resistance 110. The function of the resistance 110 will be apparent from the following description of the operation of the pulse circuit.

When the line 70 is connected to a pressure source, such as an oxygen tank, oxygen flows from the line 70 through the line 87 to the inlet 90 of the distributing valve 86 and exhausts through the pulse outlet 78. Simultaneously the pressure builds up in the pilot line 100 and after a delay period the pneumatic valve 92 opens. When the valve 92 in the pilot line 88 opens, after a delay, the condition of valve 86 changes so that the pulse outlet 78 is shut off and the distributing valve 86 directs oxygen through the pilot 108. The valve 92, however, remains open until the line 108 fills and applies a pressure of a specific magnitude to the second pneumatic valve 102. The resistance 110 and the volume as determined by the length of the line 108 control the length of the time delay between the opening of distributing valve 86 to line 94 and the opening of the valve 102. When the valve 102 opens, the pressure in the pilot 100 immediately is relieved through the bleed 104, and the pneumatic valve 92 closes. The closing of valve 92 immediately changes the condition of distributing valve 86 to place once again the inlet line 70 in communication with the pulse outlet 78 through the line 87, inlet 90 and the distributing valve. The cycle is then repeated continuously until the line 70 is disconnected from the pressure source.

It will be noted in FIG. 4 that a check valve 107 forms a bypass about the resistance 110 in a direction from line 108 toward the distributing valve 86. The check valve 107 allows the pressure in line 108 to instantaneously dissipate so as to allow the valve 102 to close. In the absence of the check valve, a delay would occur in the recycling of valve 92 because the resistance 110 would retard the depressurization of the line 108 to permit the bleed valve 102 to close.

The volume of the line 108 and the magnitude of the restriction or resistance 110 directly effects the ratio of "on" and "off" time of the pulses. If the magnitude of the resistance 110 increases, and/or the volume of the pilot line 108 increases, a longer period will be required to open the normally closed valve 102 to cause the valve 92 to close. In this manner, the ratio of "on" and "off" pulse time may be varied. The restriction 98 and the length of line 100 also control the ratio between the "on" and "off" periods of each cycle. If the resistance 98 and the volume of line 100 increase, the length of time required to open the valve 92 increases, which in turn lengthens the period during which a pulse is emitted from the distributing valve 86. These parts also indirectly effect the frequency of the pulses but more directly control the ratio between the "on" and "off" periods. To directly change the frequency of the pulses the duct 109 may be changed. If that duct is replaced with a duct of greater capacity, the time required for the distributing valve 86 to change conditions will be increased so as to directly enlarge the time required for each cycle.

The very simple pulse circuit shown in FIG. 4 serves to control the opening of valve 62 which in turn controls the cardiac compression unit 12 and also serves to operate the valve and counter 64 which, with the pilot line 66, controls the condition of distributing valve 54. It will also be recognized from the foregoing that when the line 72 is connected to the line 48 through the distributing valve 54, so that oxygen is directed to the ventilating unit 14, the pulse circuit 70 is temporarily inactive.

In FIG. 3 yet another pneumatically controlled valve 111 is shown disposed in the pilot line 66, and the pilot line 113 which controls the condition of pneumatic valve 111 is connected to the tank 58. The pneumatic valve 111 is normally maintained in the open condition as the pressure in the tank 58 serves as pilot pressure to fill the pilot line 113. However, when the pressure in the tank 58 is relieved, as when its contents are discharged through ventilating valve 60, the pressure in the line 113 diminishes and the valve 111 is closed. Therefore, when the line 72 is connected to the oxygen source and opens the ventilating valve 60 and the contents of tank 58 is discharged, the valve 111 in the pilot 66 closes to again change the condition of the distributing valve 54 so that the lines 48 and 70 are in communication with one another and pilot line 72 bleeds through exhaust 76. In this manner the cycle of distributing valve 54 is completed.

The ventilating valve 60 shown in FIG. 5 as indicated above, controls the rate at which volume is discharged to the ventilating unit 14 and specifically produces the curve in the graph of FIG. 6 circled at the beginning of the ventilating pulse. The valve includes an inlet duct 112 connected in FIG. 3 to the line 114 which directs a volume of oxygen from the tank 58 to the valve. The duct 112 empties into a cylindrical chamber 116 within the valve housing, and a spool 118 is movable back and forth within the chamber 116. In the position shown, the spool 118 interrupts the connection between the inlet duct 112 and the passage 120 which in turn is connected through a subvalve assembly 122 to the discharge duct 124.

The position of the spool 118 in the chamber 116 is controlled by a pilot duct 126 formed in the housing (not shown) and which is adapted to be connected to the pilot line 72 shown in FIG. 3. The pilot duct 126 through passage 128 is connected to the right side chamber 117, and the pilot through a second duct 130 is connected to the subvalve assembly 122. Pilot pressure introduced into the chamber to the right of the spool 118 from the line 126 moves the spool to the left. This motion of the spool 118 in the chamber 116 is retarded however, by the exhaust passage 132 connected between the left end of the chamber 116 and the inlet duct 112, and which contains resistance 134. The restricted orifice or resistance 134 in the exhaust duct 132 limits the speed with which the spool 118 may move to the left under the influence of the pilot pressure in the line 128. As the spool 118 moves to the left, a first small circular groove 136 in the spool 118 aligns itself with the inlet duct 112 and the passage 120 and serves to place the two in communication with one another. Thus, a limited flow occurs from the duct 112 to the passage 120. Further movement of the spool to the left places the larger groove 138 in alignment with the duct 112 and passage 120 to allow a greater volume of oxygen to pass between them so as to increase the volume of oxygen flowing into the passage 120. Because the pressure in the tank 58 which is a function of its volume, was set at 15 p.s.i. and diminishes as the tank empties, whereas the pressure in the pilot line 126 (connected to line 72) is normally 50 p.s.i., the spool 118 will move to the left. However, when the pilot pressure in line 72 is vented through the bleed 76 in the distributing valve 54, pressure builds up in the tank 58 and consequently increases in the chamber 116 through the passage 132 and restriction 134 so as to return the spool to the position shown in FIG. 5.

The discharge from the passage 120 is controlled by the subvalve assembly 122. The pilot pressure in the line 126 which moves the spool 118 to the left as viewed in FIG. 5 also serves to open the subvalve assembly 122 to connect the passage 120 with the discharge duct 124.

In FIG. 5 yet another valve 125 is shown connected between the passage 120 and mask 14. The valve 125 allows spontaneous breathing through the mask. The valve 125 normally connects the mask 14 to the atmosphere through its passage (not shown). However, when the pilot line 127 parallel to lines 128 and 130 is pressurized, the valve 125 temporarily connects the passage 124 to the mask so that the volume of oxygen in the tank 58 may be introduced into the lungs.

It will also be appreciated that the rate at which the volumetric flow increases may be changed by making changes in the configuration of the spool 118. By changes in the configuration of the spool the unit may be made to produce any wave form representing the volume of ventilating gas desired.

From the foregoing description it will be recognized that when the pilot line 72 in the control circuit of FIG. 3 is connected to the pilot duct 126 of the ventilating valve, the pressure in the line 72 causes the spool 118 to move to the left as viewed in the drawing so that first a small quantity of oxygen flows from the duct 112 to passage 120 across the groove 136 and through the subassembly valves 122 and 125 to the line 129. Continued movement of the spool 118 causes the deeper annular groove 138 in the spool to align itself with the passage 120 and duct 112, and consequently a greater volume of air is permitted to flow through the valves from the line 112 to the outlet 129. When the contents of the tank 58 is discharged or when the pressure in the tank 58 falls below a set value, the pneumatic valve 111 in the pilot line 66 closes so as to alter the condition of distributing valve 54. The change in condition of the valve 54 relieves the pressure in the pilot line 72, and the spool 118 in the ventilating valve returns to the position shown in the drawing as the pressure again builds up in the tank.

From the foregoing description those skilled in the art will appreciate that modifications may be made of the invention without departing from its spirit. For example, in FIGS. 7–11 five alternative pulse circuits are shown which may be suitable for use in the control circuit of FIG. 3.

In FIG. 7 a pulse circuit 150 is shown having an inlet 152, an outlet 154, and two pneumatically controlled valves 156 and 158. Pneumatically controlled valve 156 is normally open so that inlet 152 and outlet 154 are in communication with one another. The pilot line 160 controlling valve 156 includes a restriction 162 and an exhaust 164, and the exhaust 164, is controlled by the second pneumatic valve 158. The valve 158 is normally open to open the exhaust passage 164, but pressure in the pilot line 166 for controlling the valve 158 changes the condition of that valve.

In operation the pulse circuit of FIG. 7 functions as follows: initially when the inlet 152 is connected to a pressure source, a pulse is emitted at the outlet 154, for the valve 156 is open. At the same time, pilot line 160 is pressurized through its restriction 162. However, that pressure cannot be applied to the valve 156 to change its condition because the bleed 164 is open. When pressure builds up in the line 166 through the restriction 168, the valve 158 is closed to shut off the bleed 164. Consequently, pressure builds up in the bleed 160 and ultimately the condition of valve 156 changes and it closes. When the valve 156 is closed, the pressure in the pilot line 166 is relieved which causes the valve 158 to open and connect the bleed 164 to the atmosphere. This condition in turn causes the pressure in the pilot line 168 to be releaved, and the valve 156 again opens. The capacity of the pilot lines 160 and 166 control the ratio of the "on" and "off" portions of the cycle and control the frequency of the cycle. The larger the capacity of pilot line 166, the longer the time required to change the condition of valve 156, and consequently the frequency is lessened. The capacity of line 160 directly affects the relationship between the "on" and "off" period and indirectly affects the frequency of the pulses.

A very basic pulse circuit 170 is shown in FIG. 8. The pulse circuit 170 shown includes an inlet 172, an outlet 174 and a normally open pneumatically controlled valve 176. A pilot line 178 which includes a restriction 180 controls the condition of pneumatic valve 176. When the line 172 is connected to a pressure source, the normally open pneumatic valve 176 causes a pulse to be emitted from the outlet 174. This same pulse charges the pilot line 178 which ultimately causes valve 176 to close. When the valve 176 closes the pressure is relieved in the pilot 178, and the valve 176 once again opens. The capacity of the pilot line 178 particularly between the valve 176 and the restriction 180 determines the frequency of the pulses. The greater the capacity of the pilot line 178, the lower the frequency of change.

The pulse circuit 192 shown in FIG. 9 includes an inlet 193, an outlet 194, a pneumatic valve 196 which is normally closed, a second pneumatic valve 198 which is normally open, and two pilot lines 200 and 202. The valve 196 is normally closed so as to interrupt communication between the inlet and the outlet. The pneumatic valve 198 is normally open to allow the pilot line 202 to charge and therefore change the condition of the pneumatic valve 196. The restrictions 204 and 206 in the pilots perform the same delay functions as the restrictions in the other pulse circuits.

In operation, when the line 192 is connected to a pressure source, initially no oxygen is emitted at the outlet 194. However, the pilot line 202 charges, and when the capacity of the line is reached, the valve 196 opens so as to emit a pulse at the outlet. Simultaneously, the pilot line 200 is charged, and when the pressure builds up in that line a selected amount, the condition of valve 198 changes, and it closes. When the valve 198 closes, pressure in the pilot line 202 is relieved, which causes the main pneumatic control valve 196 to again close. When it closes the pulse at the outlet ceases and the pilot line 200 is relieved so as to again open the valve 198.

The pulse circuit 208 shown in FIG. 10 employs two normally closed pneumatic valves 210 and 212. The circuit also includes an inlet 214, an outlet 216 and a pair of pilot lines 218 and 220. The pilot line 220 is relieved through bleed 222.

In operation, when the inlet 214 is connected to a pressure source, the closed valve 210 prevents a pulse from being discharged at the outlet 216. However, pressure in the pilot line 220 builds up as the bleed 222 is closed by the valve 212. When the pressure in line 220 reaches a selected value, the valve 210 opens, and the circuit emits a pulse. Simultaneously, the pilot line 218 is charged to change the condition of valve 212. When the valve 212 opens, the bleed 222 is opened to the atmosphere, and the pilot line 220 is relieved to cause the valve 210 to close. In this manner the pulse ceases. The restrictions 224 and 226 in the pilot lines 218 and 220 cause the same time delay produced by the similar restrictions in the other pulse circuits, and the capacity of each of the pilot lines 218 and 222 controls the frequency of the pulses and the relative "on" and "off" periods of each cycle.

The pulse circuit 228 shown in FIG. 11 includes an inlet 230, an outlet 232, a four-way pneumatic valve 234 and a normally closed pneumatic valve 236. The four-way valve 234 is controlled by pilot line 238, and the valve 236 is controlled by pilot line 240.

The pneumatic valve 234 is normally in a condition wherein the inlet 230 and outlet 232 are connected together. Consequently, when the input 230 is connected to a pressure source, a pulse is emitted at the outlet 232. Simultaneously, pressure builds up in the pilot line 238 as its bleed 242 is closed by the valve 236. Therefore, after a period of time determined by the capacity of the line 238 and the restriction 244, the valve 234 changes its condition to discontinue communication with the outlet 232, and places the input 230 in communication with the pilot 240. After a period determined by the capacity of the pilot 240 and the restriction 246, the normally closed valve 236 changes its condition to place the bleed 242 in communication with the atmosphere. This relieves the pressure in the pilot 238, and the valve 234 again moves to the biased condition, wherein the inlet 230 and outlet 232 are in communication with one another.

In selecting pneumatic valves in the system, it is important that the operating pressure of each valve be independent of and not effect the pressure of the medium flowing through that valve. In the circuit of FIG. 3 it will be noted that the control pressure of the pneumatic valves 62 and 111 is appreciably less than the pressure of the medium flowing through those valves. Because the flow through the lines in many cases is required to be essentially constant, and because marked changes in pressure could lead to most serious consequences, the flow through the valves should be independent of the controlling pressure.

What is claimed is:
1. A valve comprising,
a casing having an inlet line and an outlet line,
a chamber on the casing connecting the inlet and outlet,
a spool mounted in the chamber and movable axially therein to allow and interrupt flow from the inlet to the outlet, said spool in a first position interrupting the flow and in a second position allowing said flow.
a pilot line connected to the chamber on one side of the spool and when pressurized urging the spool toward the second position,
means including a bleed connected to the chamber on the opposite side of the spool and connected to the inlet line for impeding flow from the chamber back into the inlet line to slow movement of the spool from the first to the second opsition, said bleed providing a pressure source from the inlet line to return the spool to its first position when the pilot line is depressurized,
and a section provided on the spool for allowing a lesser flow and then a greater flow through the casing when the spool moves from the first to the second position,
said section in the spool including an annular groove to allow limited flow through the casing when the spool moves a portion of the way from the first to the second position and said section also including a larger annular groove to allow greater flow through the casing when the spool is in the second position.
2. A lung ventilating valve assembly comprising
a casing having an inlet line and an outlet line,
a chamber on the casing connecting the inlet and outlet, a spool mounted in the chamber and movable axially therein to allow and interrupt flow from the inlet to the outlet, said spool in a first position interrupting the flow and in a second position allowing said flow,
a pilot line connected to the chamber on one side of the spool and when pressurized urging the spool toward the second position,
means including a bleed connected to the chamber on the opposite side of the spool and connected to the inlet line for impeding flow from the chamber back into the inlet line to slow movement of the spool from the first to the second position, said bleed providing a pressure source from the inlet line to return the spool to its first position when the pilot line is depressurized,
a section provided on the spool for allowing a lesser flow and then a greater flow through the casing when the spool moves from the first to the second position,
a fitting for connecting the outlet line to the lungs of a patient,
and a second valve in the outlet line opened by the pilot line.
3. A lung ventilating valve assembly as defined in claim 2 further characterized by
said second valve normally connecting the fitting to the atmosphere and being changed in condition to connect the fitting to the outlet line when the pilot line is pressurized.
4. A lung ventilating valve assembly as defined in claim 1 further characterized by
a fitting for connecting the outlet line to the lungs of a patient,
a second valve in the outlet line opened by the pilot line, said second valve normally connecting the fitting to the atmosphere and being changed in condition to connect the fitting to the outlet line when the pilot line is pressurized.

References Cited

UNITED STATES PATENTS

| 785,646 | 3/1905 | Westbrook | 251—31 X |
| 3,215,397 | 11/1965 | Gates et al. | 251—50 |

ARNOLD ROSENTHAL, Primary Examiner

U.S. Cl. X.R.

128—53; 251—25, 50